United States Patent
Nair et al.

(10) Patent No.: US 9,626,809 B1
(45) Date of Patent: *Apr. 18, 2017

(54) RESOLVING GRAPHICAL CONFLICTS BETWEEN OBJECTS

(71) Applicant: Electronic Arts Inc., Redwood City, CA (US)

(72) Inventors: Srikumar Nair, Palo Alto, CA (US); Igor Borovikov, Foster City, CA (US); Darren Gyles, San Francisco, CA (US); Brett Tribble, Moraga, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,763

(22) Filed: Jan. 20, 2017

Related U.S. Application Data

(63) Continuation of application No. 14/522,392, filed on Oct. 23, 2014, now Pat. No. 9,561,444.

(60) Provisional application No. 62/032,177, filed on Aug. 1, 2014.

(51) Int. Cl.
*G06T 19/20* (2011.01)
*G06T 13/40* (2011.01)
*A63F 13/52* (2014.01)
*A63F 13/577* (2014.01)

(52) U.S. Cl.
CPC .............. *G06T 19/20* (2013.01); *G06T 13/40* (2013.01); *A63F 13/52* (2014.09); *A63F 13/577* (2014.09); *G06T 2210/16* (2013.01); *G06T 2210/21* (2013.01); *G06T 2219/2004* (2013.01); *G06T 2219/2008* (2013.01)

(58) Field of Classification Search
CPC ......... G06T 19/20; G06T 13/40; A63F 13/55; A63F 13/577

See application file for complete search history.

(56) References Cited

U.S. PATENT DOCUMENTS

| | | | |
|---|---|---|---|
| 9,373,213 B1* | 6/2016 | Archer .................... | G07F 17/32 |
| 2016/0035142 A1* | 2/2016 | Nair ........................ | G06T 19/20 |
| | | | 345/420 |
| 2016/0117865 A1* | 4/2016 | Nair ........................ | A63F 13/63 |
| | | | 345/419 |

\* cited by examiner

*Primary Examiner* — Corbett B Coburn
(74) *Attorney, Agent, or Firm* — Lowenstein Sandler LLP

(57) ABSTRACT

A request is received to assign a first graphical asset and a second graphical asset associated with a three-dimensional (3D) geometry of a simulated character of a video game to the same physical location on the 3D geometry. A graphical conflict between the first graphical asset and the second graphical asset is detected, where the graphical conflict indicates that at least a portion of the first graphical asset and at least a portion of the second graphical asset graphically overlap at the same physical location on the 3D geometry. Attributes of the first and second graphical assets at the same physical location on the 3D geometry are compared. One of the first graphical asset or the second graphical asset is then provided for display at the physical location on the 3D geometry.

20 Claims, 10 Drawing Sheets

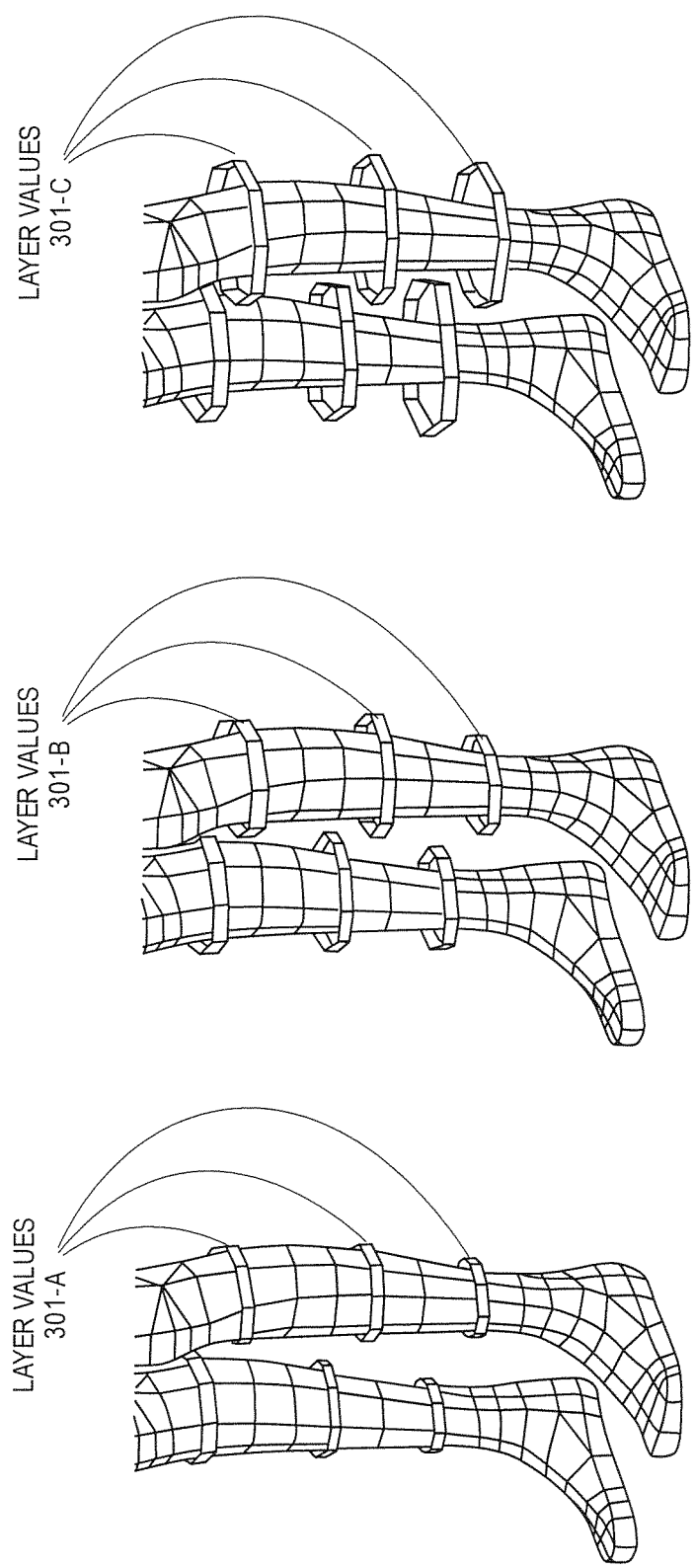

RESOLVING GRAPHICAL CONFLICTS BETWEEN OBJECTS

RELATED APPLICATIONS

This continuation application claims priority to U.S. patent application Ser. No. 14/522,392 filed on Oct. 23, 2014, which is related to and claims the benefit of U.S. Provisional Patent application Ser. No. 62/032,177, filed Aug. 1, 2014, both of which are hereby incorporated by reference.

TECHNICAL FIELD

The present disclosure is generally related to graphical simulations, and more particularly, to resolving graphical conflicts between objects in graphical simulations.

BACKGROUND

Simulation video games are a category of video games generally designed to simulate aspects of a real or fictional reality as closely as possible. A "life simulation" is a sub category of simulation video games in which a player can control one or more virtual life forms (e.g., a simulated human character, an animal, etc.). The SIMS 3, published by Electronic Arts Inc., is an example of a life simulation video game. In The SIMS 3, a player can create a character for a life simulation and configure its appearance by changing its body type, physical attributes, clothing, or accessories. A player may select from a predefined list of "parts" or "graphical assets" such as hair, hats, pants, shirts, boots, shoes, etc. The player can then assign one or more graphical assets to physical locations on the simulated character. Where the graphical assets overlap on the simulated character, graphical conflicts may be created, requiring a decision to be made (either by the user when selecting the graphical assets or by the simulation) regarding which asset to display on the character at the point of overlap. In The SIMS 3, graphical assets are designed to avoid graphical conflicts entirely by strongly limiting asset pairing combinations. For example, all boot assets are designed with a fixed height (so that all boots pair with all pants at a specific physical location on the simulated character) and type (so that all boots will always cover all pants). Additionally, hat assets may not be combined with different types of hair assets. All hat assets are designed with an incorporated hair asset to avoid resolving graphical conflicts between pairing a hat asset that appears tightly fitting (e.g., a baseball cap) to a hair asset that appears comparatively voluminous (e.g., curly hair or an "afro" hairstyle). Further, more unusual types of graphical assets that span multiple physical locations of the simulated character require a complete asset replacement, such as a full-body outfit.

BRIEF DESCRIPTION OF THE DRAWINGS

The present disclosure is illustrated by way of example, and not by way of limitation, and can be more fully understood with reference to the following detailed description when considered in connection with the figures in which:

FIG. 3A illustrates an example of layer values associated with graphical assets, in accordance with one or more aspects of the present disclosure.

FIG. 3B illustrates an example of layer values associated with graphical assets, in accordance with one or more aspects of the present disclosure.

FIG. 3C illustrates an example of layer values associated with graphical assets, in accordance with one or more aspects of the present disclosure.

DETAILED DESCRIPTION

Figure 1B:
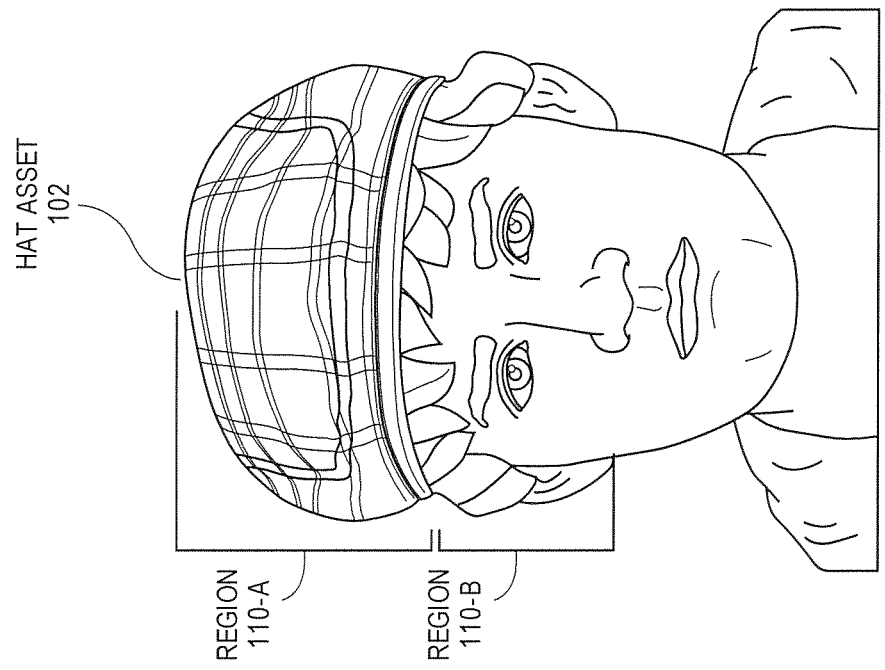
FIG. 1B illustrates an example of a graphical asset of a simulated character, in accordance with one or more aspects of the present disclosure.

Described herein are methods and systems for resolving graphical conflicts between pairs of graphical assets. In some implementations, a player can create a character for a life simulation and configure its appearance by changing its body type, physical attributes, clothing, or accessories. A player may select from a predefined list of "parts" or "graphical assets" (meaning, a list of graphical assets that are included in the life simulation game that may be selected for a simulated character) such as hair, hats, pants, shirts, boots, shoes, etc. The player can then assign one or more graphical assets to physical locations on the simulated character. Where the graphical assets overlap on the simulated character, graphical conflicts may be created, requiring a determination to be made by the simulation regarding which asset to display on the character at the point of overlap. Often, simulation video games avoid graphical conflicts by only permitting specific assets to be paired with each other (e.g., only certain boots can be paired with a particular pair of pants). Additionally, conflict is commonly avoided by displaying a generic asset geometry where a conflict might otherwise be detected. For example, if a player selects a hat for a simulated character, the hat would include a small patch of hair that would not typically conform to any hair asset previously selected for the character. This technique can simplify character generation by avoiding graphical conflicts completely. However, it can severely limit the ability to customize a character by limiting the available asset pairing combinations. Additionally, it can prevent future expansion of available asset options by requiring predefined pairing combinations.

Aspects of the present disclosure address the above noted deficiency by resolving graphical conflicts between graphical assets dynamically (as assets are paired together during simulation execution) without requiring predefined asset pairing relationships. In an illustrative example, a graphical asset pairing system receives a first and second graphical asset associated with a simulated character of a video game. A graphical asset can include a 3D geometry associated with a graphic rendering of an entire object. For example, a 3D geometry of a shoe, a boot, a "garment bottom" (e.g., a pair of pants), a "garment top" (e.g., a shirt or blouse), a hat, hair, or any similar graphical object associated with a simulated character can be a graphical asset. Once received, the graphical assets can be paired together where they share the same physical location on the simulated character. For example, a hair asset may be paired with a hat asset at the top of the simulated character's head. Alternatively, a boot asset may be paired with a garment bottom asset at the simulated character's lower leg (e.g., a area that spans the ankle to the knee).

The graphical asset pairing system can then resolve any graphical conflicts between the graphical assets as a result of the pairing. A graphical conflict can occur when one graphical asset overlaps with another graphical asset at a particular physical location of the simulated character where portions of each of the asset are intended to occupy the same space on the character. For example, when a hair asset and a hat asset are selected for the top of the head of a simulated character, a graphical conflict occurs since both assets cannot be displayed at the same time. Additionally, portions of the hair asset may extend beyond the outside of the boundary of the hat asset at different areas of the head of the simulated character. Alternatively, when a boot asset and a garment bottom asset overlap at the lower leg of a simulated character, either the boot or the garment bottom may be displayed depending on the graphical size or graphical thickness of either asset. For example, a boot might be displayed over the top of a pair of tights, but displayed beneath a pair of wide bottom pants (e.g., "bell-bottom" pants).

In one illustrative example, a pair of graphical assets can be compared at a single location on the simulated character to resolve a graphical conflict at that location. In certain implementations, a location at which a pair of graphical assets can be compared may be referred to as a region of the simulated character. A simulated character can include a plurality of regions, each of which may define a point on the character where graphical assets may be assigned, and therefore, where pairs of graphical assets may overlap. In certain implementations, the region location that represents the center of the character (e.g., the abdomen of a human character) may be referred to as the "root" region, and the region location that represents a character's physical extremity (e.g., a hand or foot of a human character) may be referred to as a "leaf" region. A graphical asset can be defined such that it is associated with the region of the simulated character. For example, a boot may be defined such that it is associated with regions of the lower leg (ankle, calf, knee). A lower cut boot may include two regions (ankle and calf) whereas a combat boot may include three regions (ankle, calf, and knee). Region values may be defined alphabetically, numerically, or in any other manner.

To resolve a graphical conflict, the graphical asset pairing system may identify the region of the simulated character where a portion of a graphical asset overlaps a portion of another graphical asset. Once the region of the simulated character is identified, a layer value for each asset at the region location may be determined. A layer value can define how closely a graphical asset attaches or sits on the skin of a simulated character (representing the size or thickness of the graphical asset in relation to proximity to the skin of a simulated character). A graphical asset that attaches to a character close to the character's skin (e.g., a pair of skin-tight leggings) may have a relatively low layer value, while a graphical asset that sits further way from the character's skin (e.g., a pair combat boots, which are typically very large and thick in comparison) may have a relatively high layer value. Layer values can be assigned alphabetically, numerically, or in any other manner. For example, layer values for graphical assets associated with the lower leg of a simulated character may be assigned using numbers 1 (skin tight leggings), 2 (tight boots), 3 (pants), 4 (loose boots), 5 (bell-bottom pants), and 6 (combat boots).

Subsequently, the graphical asset pairing system can compare the layer values of the portions of the graphical assets at the identified region location, and select the portion of the graphical asset with the greater layer value at the region location for display on the simulated character. The selected graphical asset can then be displayed at the region location of the simulated character. For example, the graphical asset pairing system may receive a hair asset with a layer value of 1 and a hat asset with a layer value of 2 to be paired at a region location representing the top of a character's head. The graphical asset pairing system can compare the layer values of the hat and hair, determine that the layer value of the hat is greater than the layer value of the hair, and select the portion of the hat asset that occupies the region at the top of the head for display. The graphical asset pairing system will then display the selected asset.

In another illustrative example, a pair of graphical assets can be compared at a single region location on the simulated character to both resolve a graphical conflict at that region location, as well as affect the display of one of the graphical assets in a neighboring adjacent region location. One graphical asset may occupy a first region, and another graphical asset may occupy the first region as well as a second region that is adjacent to the first region on the simulated character. For example, a hair asset that occupies two regions of a simulated character (e.g., the top of the head and middle of the head) may be graphically affected at the second region (middle of the head) when paired with a hat at the first region (top of the head).

To resolve the graphical conflict, the graphical asset pairing system may identify the region of the simulated character where a portion of a graphical asset overlaps a portion of another graphical asset (e.g., hair asset and hat asset at the top of the head). The graphical asset pairing system may then identify the second region of the simulated character where one of the graphical assets is present, but where the two graphical assets do not graphically overlap (e.g., a hair asset that extends to the middle of the head where the hat asset is not present). Once the regions of the simulated character are identified, the layer value may be determined for each asset at the first region location.

Subsequently, the graphical asset pairing system can compare the layer values of the portions of the graphical assets at the first region location, and select the portion of the graphical asset with the greater layer value at the first region location for display on the simulated character at the first region location. If the graphical asset that occupies both regions (the hair asset) has a greater layer number for the first region than the graphical asset that only occupies the first region (the hat asset), then the hair asset is selected for display at both region locations. If the graphical asset that occupies only the first region (the hat asset) has a greater layer number for the first region than the graphical asset that occupies both regions (the hair asset), the graphical asset with the greater layer number is selected for display at the first region and the portion of graphical asset that occupies both regions replaced in the second region with a modified version (e.g., a modified version of the hair asset that appears compressed due to the presence of the hat asset). The selected graphical asset can then be displayed at the first region location and the modified graphical asset can be displayed at the second region location of the simulated character.

In another illustrative example, a pair of graphical assets that graphically overlap in a plurality of region locations on the simulated character can be compared at a single region location to resolve any graphical conflicts that occur for the plurality of regions locations. Each graphical asset may possess a layer value for each region location, therefore graphical conflicts may occur in each of the region locations. For example, a boot asset and a bell-bottom pants asset may each occupy multiple regions at the lower leg of a simulated character (e.g., ankle, calf, knee). Each asset may possess different layer values for each of the regions. The boot asset may be wider at the knee and narrow at the ankle whereas the pants asset may be wider at the ankle and narrower at the knee. Thus, the pants asset would possess a greater layer value at the ankle, but the boots asset would possess a greater layer value at the knee.

To resolve the graphical conflict, the graphical asset pairing system can identify the region of the simulated character most remote in proximity from the "root" region where a portion of one graphical asset overlaps a portion of another graphical asset (e.g., at the ankle region for the case of the boot and pants assets described above). The graphical asset pairing system may then identify all of the regions of the simulated character where the graphical assets graphically overlap between the most remote region and the "root" region (e.g., calf, and knee). Once the regions of the simulated character are identified, the layer value may be determined for each asset at the remote region location (e.g., the ankle region).

Subsequently, the graphical asset pairing system can compare the layer values of the portions of the graphical assets at the remote region location, and select the portion of the graphical asset with the greater layer value at the remote region location for display on the simulated character at each of the identified region locations where the graphical assets overlap. Referring to the boots and pants example above, since the pants asset possesses a greater layer value than the boots asset at the ankle region, the graphical asset pairing system will select the pants for display at each of the identified regions where the two assets overlap (e.g., at the ankle, calf, and knee regions). The selected graphical asset can then be displayed at each region location of the simulated character.

Aspects of the present disclosure are thus capable of resolving graphical conflicts between pairs of graphical assets without requiring predefined relationships between specific graphical assets. More particularly, aspects of the present disclosure allow any available graphical asset to be paired with another and can resolve any graphical conflicts that arise. Moreover, newly created graphical assets can be incorporated with minimal configuration.

Figure 1A:
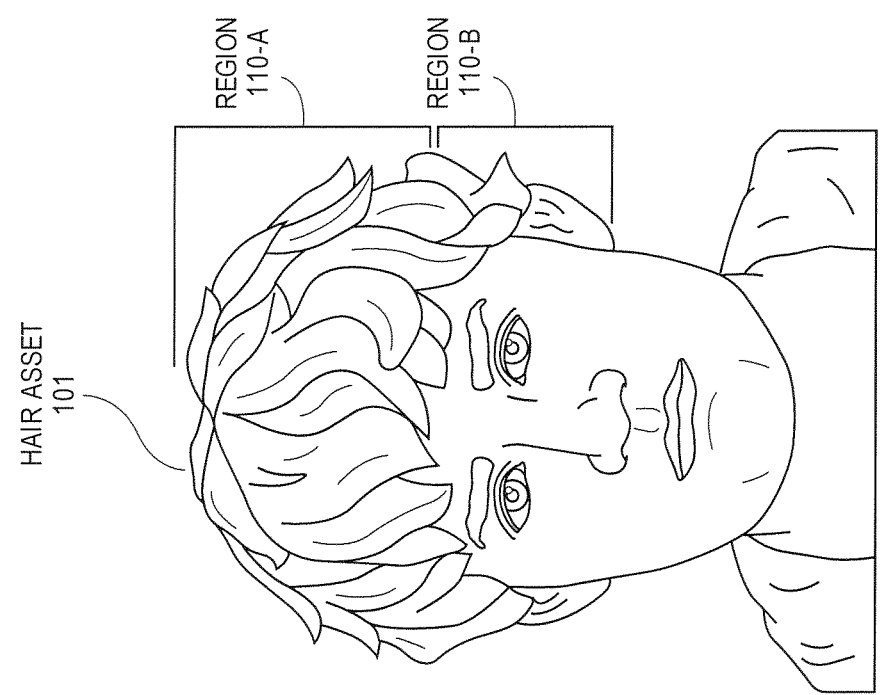
FIG. 1A illustrates an example of a graphical asset of a simulated character, in accordance with one or more aspects of the present disclosure.

FIGS. 1A-1D illustrate examples of graphical assets of a simulated character. FIG. 1A illustrates an example of a portion of a simulated character where a hair asset 101 has been associated with the physical location of the head area. Hair asset 101 occupies region 110-A (associated with the top of the head) and immediately adjacent region 110-B (associated with the middle of the head). As previously noted, a simulated character can include a plurality of regions, each representing a cross-section of an area of a simulated character. FIG. 1B illustrates an example of a portion of the simulated character where a hat asset 102 has been associated with the same physical location of the head area as hair asset 101. Hat asset 102 occupies only region 110-A (the top of the head).

Figure 1D:
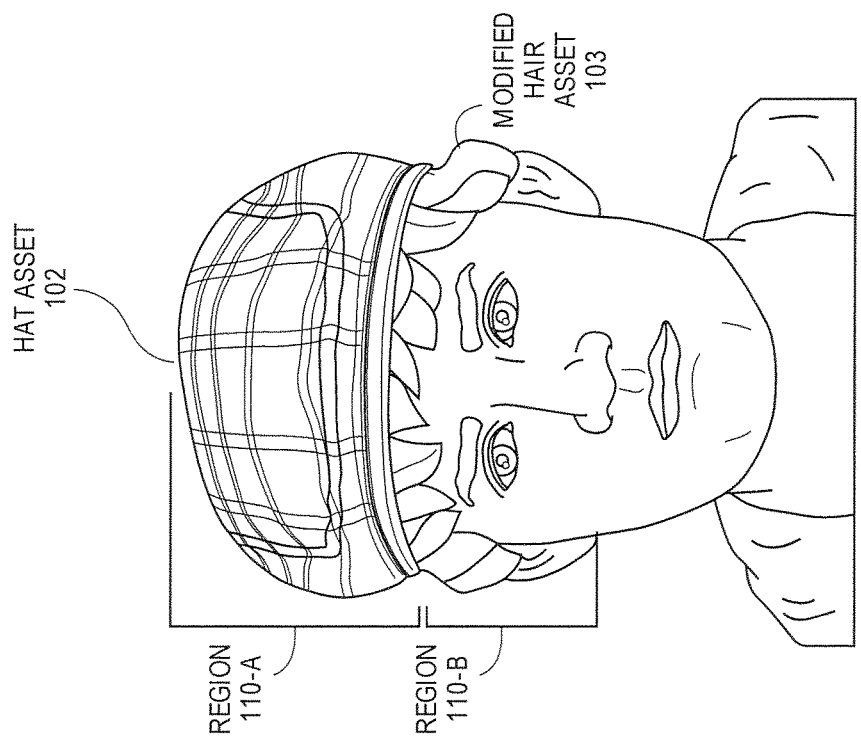
FIG. 1D illustrates an example of a modified portion of a graphical asset of a simulated character, in accordance with one or more aspects of the present disclosure.
Figure 1C:
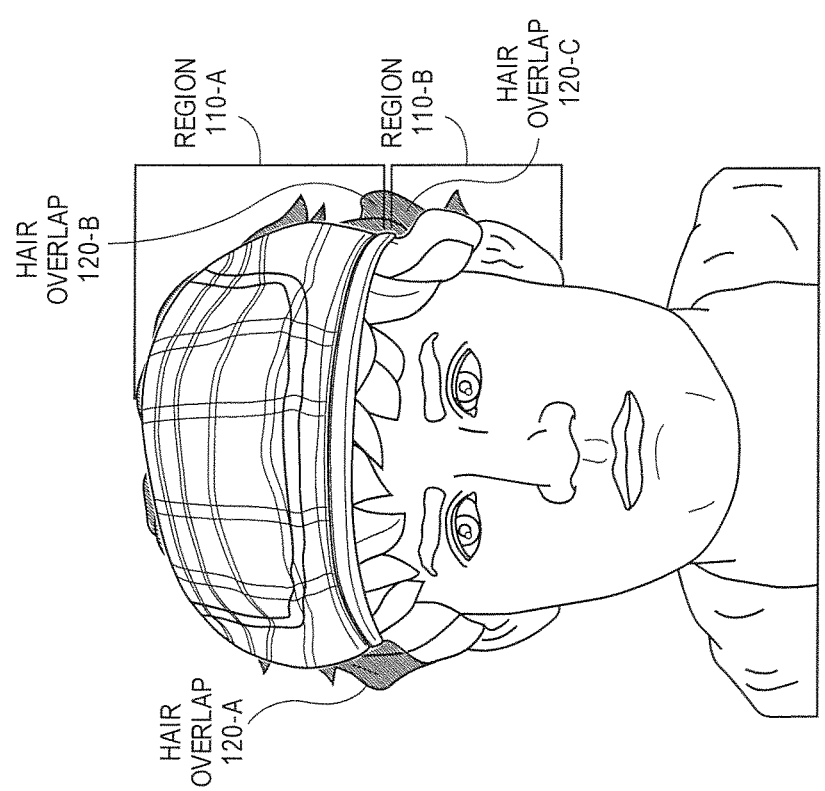
FIG. 1C illustrates an example of overlapping graphical assets of a simulated character, in accordance with one or more aspects of the present disclosure.

FIG. 1C illustrates an example of a graphical conflict between assets that overlap when associated with the same region. Hair asset 101 and hat asset 102 have both been associated with region 110-A, and thus the two assets overlap. The overlap between the two assets is distinguished in FIG. 1C since hair asset 101 includes more graphical surface area than hat asset 102. Particular areas of overlap are illustrated by hair overlap 120-A and hair overlap 120-B in region 110-A. Aspects of the present disclosure can resolve the conflict between hair asset 101 and hat asset 102 to eliminate the hair overlap 120-A and hair overlap 120-B as described in detail below with respect to FIGS. 5 and 6. For example, assuming that hat asset 102 possesses a greater layer value than hair asset 101, hat asset 102 can be selected for display at region 110-A and hair asset 101 (including the associated hair overlap 120-A and 120-B) will be suppressed at region 110-A.

Hair overlap 120-C illustrates the portion of hair asset 101 that occupies the adjacent region 110B. When hat asset 102 is selected for display in region 110-A, aspects of the present disclosure can modify the portion of hair asset 101 that includes hair overlap 120-C as described in detail below with respect to FIG. 6. FIG. 1D illustrates the resulting modification of hair asset 101 at region 110-B. Modified hair asset 103 can be selected to replace hair overlap 120-C at region 110-B to resolve the graphical conflict. It should be noted that while FIGS. 1A-1D illustrate a particular area of a simulated character, one of ordinary skill in the art will appreciate that the described aspects of the present disclosure are not limited only to this area, and thus may be applied to all regions of a simulated character.

Figure 2B:
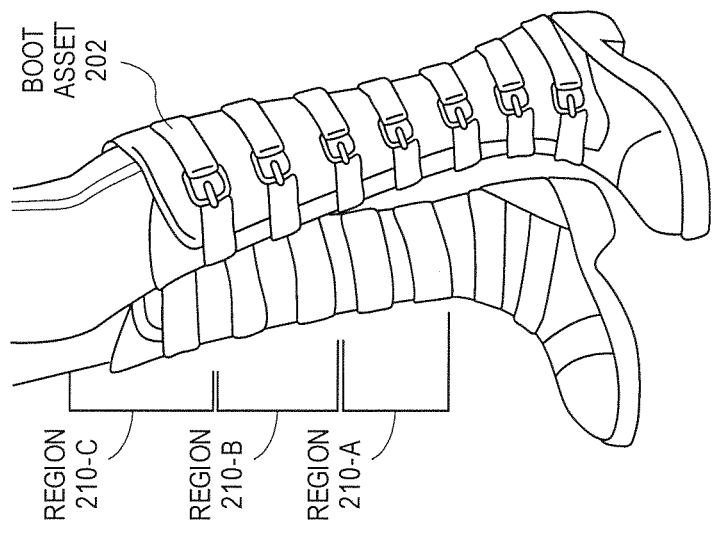
FIG. 2B illustrates an example of graphical asset conflict resolution across a plurality of regions of a simulated character, in accordance with one or more aspects of the present disclosure.
Figure 2A:
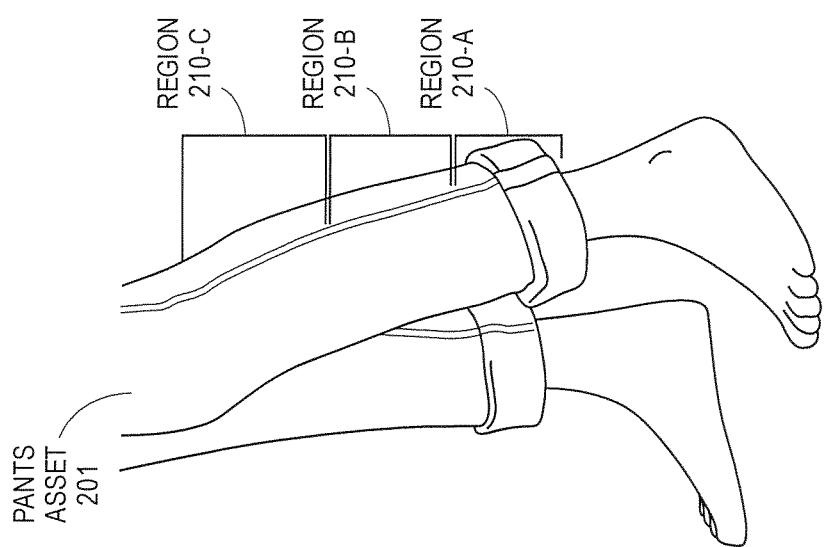
FIG. 2A illustrates an example of a graphical asset conflict resolution across a plurality of regions of a simulated character, in accordance with one or more aspects of the present disclosure.

FIGS. 2A-2D illustrate examples of graphical asset conflict resolution across a plurality of regions of a simulated character. FIG. 2A illustrates an example of a portion of a simulated character where a pants asset 201 has been associated with the physical location of the lower leg area of a simulated character. Pants asset 201 occupies region 210-A (associated with the ankle area), region 210-B (associated with the calf area), and region 210-C (associated with the knee area). In this example, region 210-A represents the region that is most remote with respect to the "root" region of the simulated character.

FIG. 2B illustrates an example of a portion of the simulated character where a boot asset 202 has been associated with the same physical location of lower leg area as pants asset 201, creating a graphical conflict between the two assets across regions 210-A, 210-B, and 210C. Aspects of the present disclosure can resolve the conflict between pants asset 201 and boots asset 202 as described in detail below with respect to FIG. 7. For example, assuming that boot asset 202 possesses a greater layer value than pants asset 201 at region 210-A (the region most remote with respect to the "root" region of the simulated character), boot asset 202 can be selected for display at each region where the two assets overlap. Here, since the assets overlap at regions 210-A, 210-B, and 210-C, boot asset 202 will be selected for display for each of the three regions.

Figure 2D:
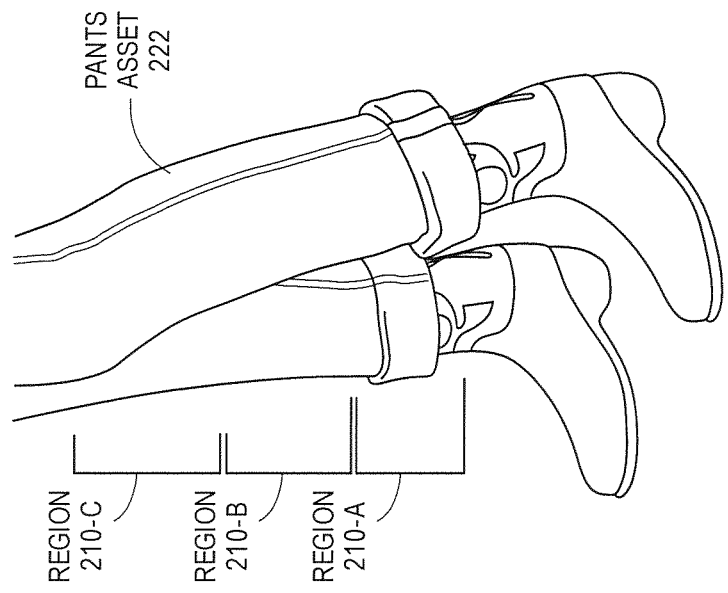
FIG. 2D illustrates an example of graphical asset conflict resolution across a plurality of regions of a simulated character, in accordance with one or more aspects of the present disclosure.
Figure 2C:
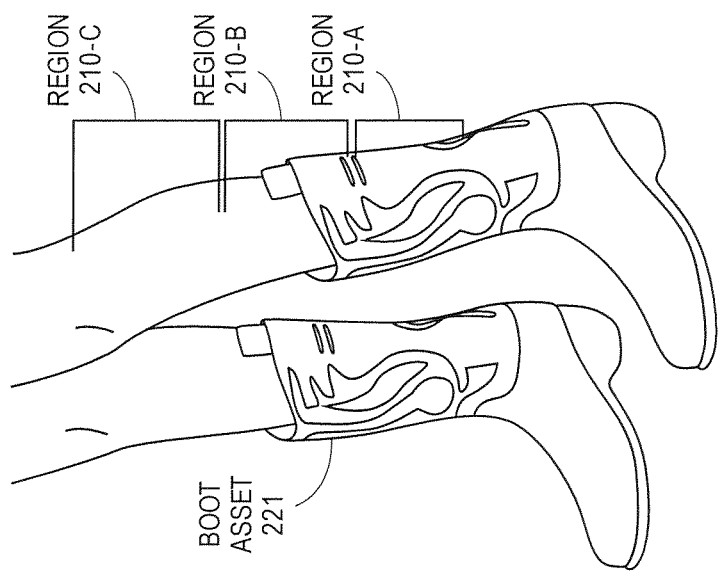
FIG. 2C illustrates an example of graphical asset conflict resolution across a plurality of regions of a simulated character, in accordance with one or more aspects of the present disclosure.

FIG. 2C-D illustrate an alternative example of a portion of the simulated character where a boot asset 221 has been associated with the same physical location of lower leg area as pants asset 222, creating a graphical conflict between the two assets across regions 210-A, and 210-B. Aspects of the present disclosure can resolve the conflict between pants asset 201 and boots asset 202 as described in detail below with respect to FIG. 7. For example, assuming that pants asset 222 possesses a greater layer value than boots asset 221 at region 210-A (the region most remote with respect to the "root" region of the simulated character), pants asset 222 can be selected for display at each region where the two assets overlap. Here, since the assets overlap at regions 210-A, and 210-B, pants asset 222 will be selected for display for each of the two regions.

Figure 4:
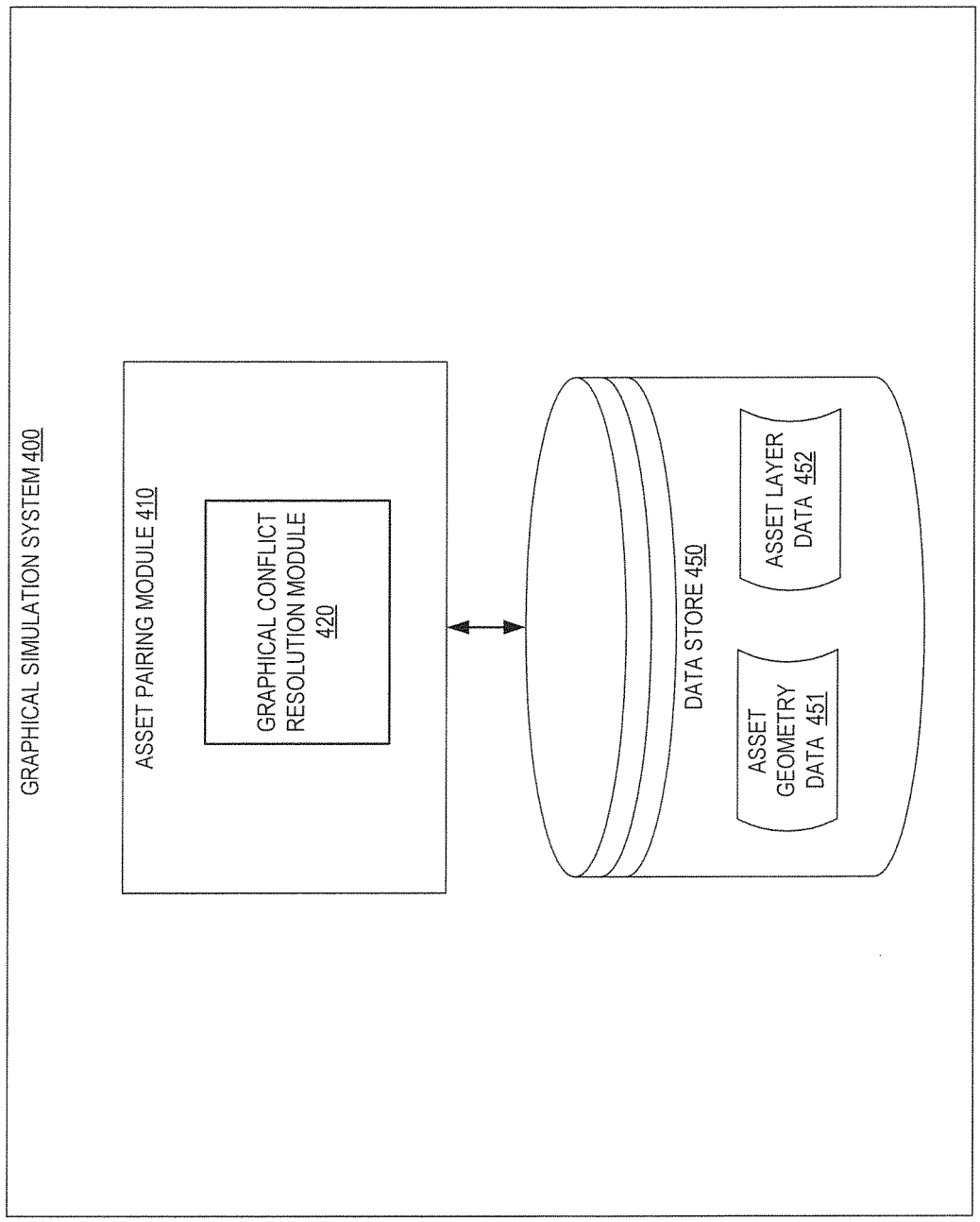
FIG. 4 depicts a high-level component diagram of an example graphical simulation system architecture, in accordance with one or more aspects of the present disclosure.

FIG. 4 depicts a high-level component diagram of an illustrative example of a graphical simulation system 400, in accordance with one or more aspects of the present disclosure. One skilled in the art will appreciate that other architectures for graphical simulation system 400 are possible, and that the implementation of a computer system utilizing examples of the invention are not necessarily limited to the specific architecture depicted by FIG. 4.

As shown in FIG. 4, the graphical simulation system 400 may include an asset pairing module 420 and a data store 450 (e.g., one or more magnetic hard disk drives, a Universal Serial Bus [USB] solid state drive, a Redundant Array of Independent Disks [RAID] system, a network attached storage [NAS] array, etc.). The graphical simulation system 400 may be a server, a mainframe, a workstation, a personal computer (PC), a mobile phone, a palm-sized computing device, etc. Graphical simulation system can generate and maintain simulated characters for use in a video game. For example, graphical simulation system can be accessed by a user via a graphical user interface to create a simulated character for use in a video game. Alternatively, graphical simulation system may be used as a runtime component of a video game, providing real time modifications to simulated characters during execution of the video game (meaning, graphical conflicts between assets associated with a simulated character may be resolved as they occur during the execution of the simulation video game).

Asset pairing module 410 can manage the pairing of graphical assets associated with a simulated character. In certain implementations, asset pairing module 410 may be invoked by a graphical user interface to select graphical assets for particular physical locations of a simulated character. For example, a user interface may permit a user to select a hat asset and a hair asset to associate with the top of a simulated character's head.

Asset pairing module may additionally include graphical conflict resolution module 420 that can resolve graphical conflicts between pairs of graphical assets associated with the same physical area of a simulated character, as described in detail below with respect to FIGS. 5-7. It should be noted that in some alternative implementations, graphical conflict resolution module 420 may be external to asset pairing module 410, rather than embedded within asset pairing module 410, or may replace asset pairing module 410.

Data store 450 can store information related to graphical assets that may be used to build a simulated character for a video game. Data store 450 may include asset geometry data 451, which can store the geometry data for each graphical asset available in graphical simulation system 400 (e.g., the shape, color, and appearance of each asset, etc.). Data store 450 may additionally include asset layer data 452, which can store the layer values for each asset at predefined region locations for simulated characters. Information from data store 450 can be accessed by graphical conflict resolution module 420 to resolve graphical conflicts, as described in detail below with respect to FIGS. 5-7.

FIGS. 3A-3C illustrate examples of layer values associated with graphical assets. Layer values 301-A of FIG. 3A depict a graphical representation of a set of layer values that may be in close proximity to the skin of a simulated character (e.g., skin-tight leggings). Layer values 301-B of FIG. 3B depict a graphical representation of a set of layer values that may be one level further in proximity from the skin of a simulated character (e.g., pants). Layer values 301-C of FIG. 3C depict a graphical representation of a set of layer values that may be a third level further in proximity from the skin of a simulated character (e.g., bell-bottom pants). While only three different layers are depicted, many more layer values may be associated with a particular graphical asset of a simulated character. For each of layer values 301-A, 301-B, and 301-C the proximity to the skin is illustrated by the diameter of the ring surrounding the depicted leg geometry. Additionally, each ring is depicted at a region location associated with the lower leg area of the simulated character.

Figure 5:
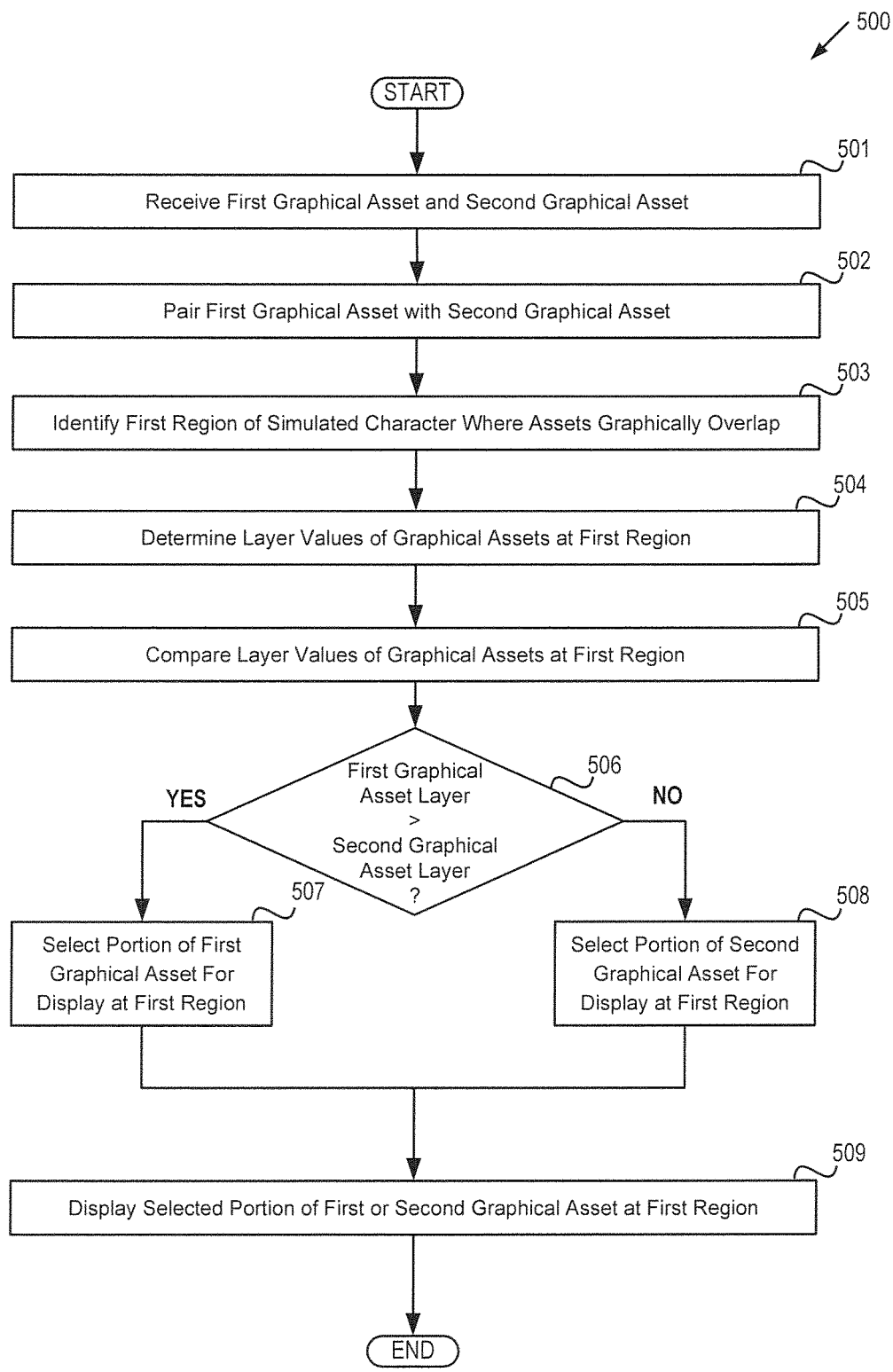
FIG. 5 depicts a flow diagram of a method for resolving graphical conflicts between a pair of graphical assets at a single region of a simulated character, in accordance with one or more aspects of the present disclosure.

FIG. 5 depicts a flow diagram of an example method 500 for resolving graphical conflicts between a pair of graphical assets at a single region of a simulated character. The method may be performed by graphical conflict resolution processing logic that may comprise hardware (circuitry, dedicated logic, etc.), software (such as is run on a general purpose computer system or a dedicated machine), or a combination of both. In one illustrative example, method 500 may be performed by graphical conflict resolution module 420 in FIG. 4. Alternatively, some or all of method 500 might be performed by another machine. It should be noted that blocks depicted in FIG. 5 could be performed simultaneously (at least partially overlapping in time) or in a different order than that depicted.

At block 501, processing logic receives a first graphical asset and a second graphical asset associated with a simulated character of a video game. A graphical asset can include a 3D geometry associated with a graphic rendering of an entire object. For example, a 3D geometry of a shoe, a boot, a "garment bottom" (e.g., a pair of pants), a "garment top" (e.g., a shirt or blouse), a hat, hair, or any similar graphical object associated with a simulated character can be a graphical asset.

At block 502, processing logic pairs the first graphical asset with the second graphical asset where the graphical assets share the same physical location on the simulated character. For example, a hair asset may be paired with a hat asset at the top of the simulated character's head. Alternatively, a boot asset may be paired with a garment bottom asset at the simulated character's lower leg (e.g., a area that spans the ankle to the knee).

At block 503, processing logic identifies a first region of the simulated character where the first graphical asset and the second graphical asset graphically overlap. A region of a simulated character is a location at which a pair of graphical assets may be compared. In certain implementations, the region location that represents the center of the character (e.g., the abdomen of a human character) may be referred to as the "root" region, and the region location that represents a character's physical extremity (e.g., a hand or foot of a human character) may be referred to as a "leaf" region. A graphical asset can be defined such that it is associated with the region of the simulated character. For example, a boot may be defined such that it is associated with regions of the lower leg (ankle, calf, knee). A lower cut boot may include two regions (ankle and calf) whereas a combat boot may include three regions (ankle, calf, and knee). Region values may be defined alphabetically, numerically, or in any other manner.

At block 504, processing logic determines the layer values of the first graphical asset and the second graphical asset at the region location identified at block 503. A layer value can define how closely a graphical asset attaches or sits on the skin of a simulated character (representing the size or thickness of the graphical asset in relation to proximity to the skin of a simulated character). A graphical asset that attaches to a character close to the character's skin (e.g., a pair of skin-tight leggings) may have a relatively low layer value, while a graphical asset that sits further way from the character's skin (e.g., a pair combat boots, which are typically very large and thick in comparison) may have a relatively high layer value. Layer values can be assigned alphabetically, numerically, or in any other manner. For example, layer values for graphical assets associated with the lower leg of a simulated character may be assigned using numbers 1 (skin tight leggings), 2 (tight boots), 3 (pants), 4 (loose boots), 5 (bell-bottom pants), and 6 (combat boots).

At block 505, processing logic compares the layer values of the portions of the graphical assets at the first region location identified at block 503. At block 505, processing logic braches depending on the result of the comparison at block 505. If the layer value of the first graphical asset at the first region location is greater than the layer value of the second graphical asset at the first region location, processing logic will proceed to block 507, otherwise processing logic will proceed to block 508.

At block 507, processing logic selects a portion of the first graphical asset for display at the first region of the simulated character. At block 508, processing logic selects a portion of the second graphical asset for display at the first region of the simulated character.

At block 509, processing logic displays the selected portion of the first or second graphical asset at the first region of the simulated character. After block 509, the method of Figure X terminates.

Figure 6:
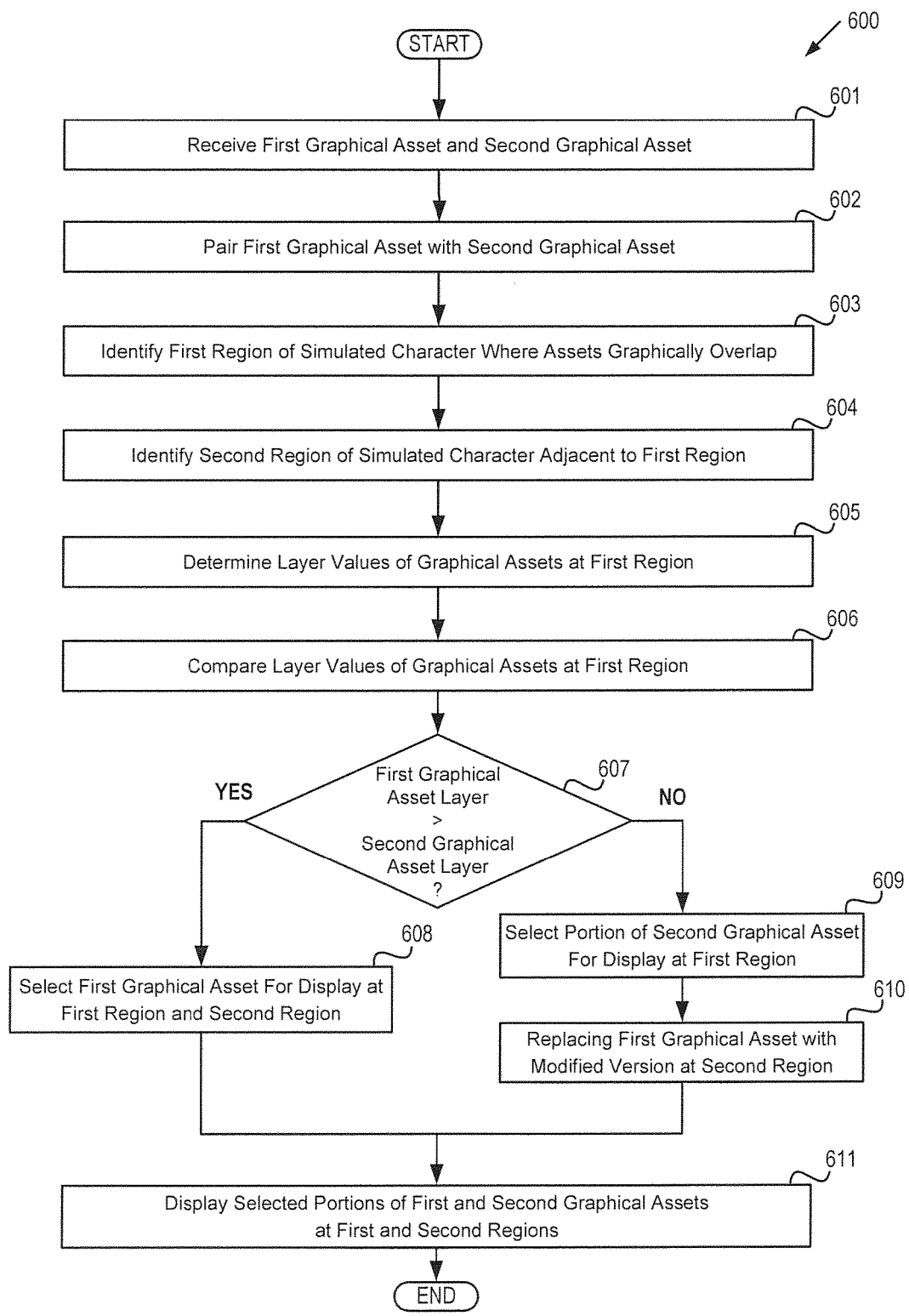
FIG. 6 depicts a flow diagram of a method for resolving graphical conflicts between a pair of graphical assets at adjacent regions of a simulated character, in accordance with one or more aspects of the present disclosure.

FIG. 6 depicts a flow diagram of an example method 600 for resolving graphical conflicts between a pair of graphical assets at adjacent regions of a simulated character. The method may be performed by processing logic that may comprise hardware (circuitry, dedicated logic, etc.), software (such as is run on a general purpose computer system or a dedicated machine), or a combination of both. In one illustrative example, method 600 may be performed by graphical conflict resolution module 420 in FIG. 4. Alternatively, some or all of method 600 might be performed by another machine. It should be noted that blocks depicted in FIG. 6 could be performed simultaneously (at least partially overlapping in time) or in a different order than that depicted.

At block 601, processing logic receives a first graphical asset that occupies adjacent regions and a second graphical asset that occupies only one region associated with a simulated character of a video game. For example, a hair asset that occupies two regions of a simulated character (e.g., the top of the head and middle of the head) and a hat asset that occupies only one region (top of the head).

At block 602, processing logic pairs the first graphical asset with the second graphical asset where the graphical assets share the same region location on the simulated character. At block 603, processing logic identifies a first region of the simulated character where the first graphical asset and the second graphical asset graphically overlap. For example, for a hair asset and a hat asset that overlap at the top of the head of a simulated character, the region representing the top of the head would be identified at this block.

At block 604, processing logic identifies a second region of the simulated character adjacent to the first region, where one of the graphical assets is present, but where the two graphical assets do not graphically overlap. For example, when a hair asset extends to the middle of the head where the hat asset is not present, the region representing the middle of the head would be identified at this block.

At block 605, processing logic determines the layer values of the first graphical asset and the second graphical asset at the first region location identified at block 603. At block 606, processing logic compares the layer values of the portions of the graphical assets at the first region location identified at block 603. At block 607, processing logic braches depending on the result of the comparison at block 606. If the layer value of the first graphical asset at the first region location is greater than the layer value of the second graphical asset at the first region location (e.g., the hair asset has greater layer value than the hat asset), processing logic will proceed to block 608, otherwise (e.g., the hat asset has a greater layer value than the hair asset), processing logic will proceed to block 609.

At block 608, processing logic selects the first graphical asset for display at the first region and the second region of the simulated character (e.g., the hair asset is selected for display at both regions). At block 609, processing logic selects a portion of the second graphical asset for display at the first region of the simulated character (e.g., the hat asset is selected for display at the first region). At block 610, processing logic replaces the portion of the first graphical asset that occupies both regions (e.g., the hair asset) with a modified version in the second region (e.g., a modified version of the hair asset that appears compressed due to the presence of the hat asset).

At block 611, processing logic displays the selected portions of the first and second graphical assets at the first region and the second region of the simulated character. After block 611, the method of FIG. 6 terminates.

Figure 7:
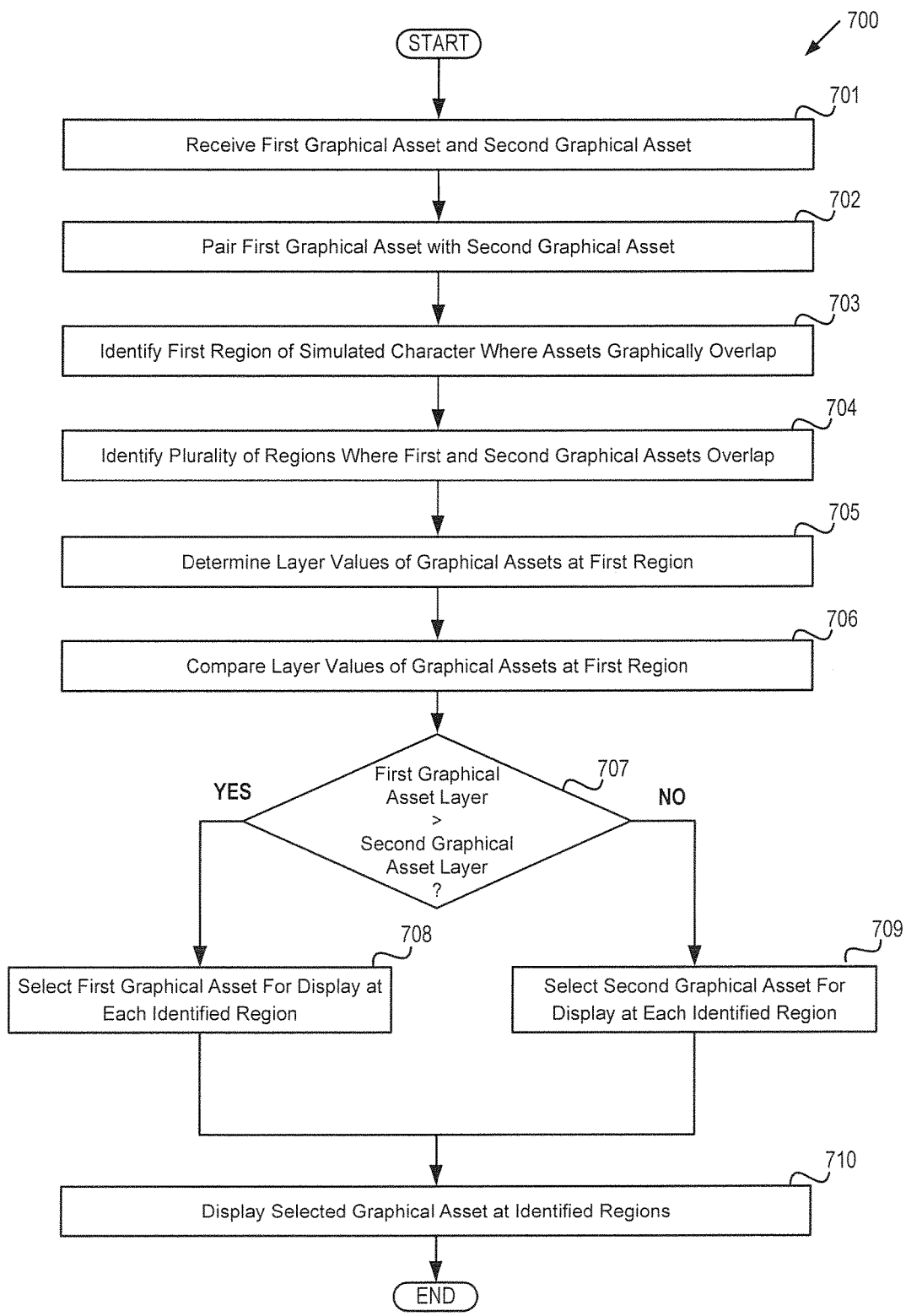
FIG. 7 depicts a flow diagram of a method for resolving graphical conflicts between a pair of graphical assets at a plurality of adjacent regions of a simulated character, in accordance with one or more aspects of the present disclosure.

FIG. 7 depicts a flow diagram of an example method 700 for resolving graphical conflicts between a pair of graphical assets at a plurality of adjacent regions of a simulated character. The method may be performed by processing logic that may comprise hardware (circuitry, dedicated logic, etc.), software (such as is run on a general purpose computer system or a dedicated machine), or a combination of both. In one illustrative example, method 700 may be performed by graphical conflict resolution module 420 in FIG. 4. Alternatively, some or all of method 700 might be performed by another machine. It should be noted that blocks depicted in FIG. 7 could be performed simultaneously (at least partially overlapping in time) or in a different order than that depicted.

At block 701, processing logic receives a first graphical asset and a second graphical asset that overlap in a plurality of regions associated with a simulated character of a video game. For example, a boot asset and a bell-bottom pants asset may each occupy multiple regions at the lower leg of a simulated character (e.g., ankle, calf, and knee).

At block 702, processing logic pairs the first graphical asset with the second graphical asset where the graphical assets share the same region locations on the simulated character. At block 703, processing logic identifies a first region of the simulated character most remote in proximity from the "root" region of the simulated character where a portion of the first graphical asset overlaps a portion of the second graphical asset (e.g., the ankle region for the case of the boot and pants assets described above).

At block 704, processing logic identifies all regions of the simulated character where the graphical assets graphically overlap between the first (remote) region and the "root" region (e.g., the calf, and knee would be identified). At block 705, processing logic determines the layer values of the first graphical asset and the second graphical asset at the first (remote) region location identified at block 703 (e.g., the ankle region).

At block 706, processing logic compares the layer values of the portions of the graphical assets the first (remote) region location identified at block 703. At block 707, processing logic braches depending on the result of the comparison at block 706. If the layer value of the first graphical asset at the first (remote) region location is greater than the layer value of the second graphical asset at the first (remote) region location, processing logic will proceed to block 708, otherwise, processing logic will proceed to block 709.

At block 708, processing logic selects the first graphical asset for display at each of the identified region locations where the graphical assets overlap on the simulated character. At block 709, processing logic selects a portion of the second graphical asset for display each of the identified region locations where the graphical assets overlap on the simulated character.

At block 710, processing logic displays the selected graphical asset at the each of the identified regions of the simulated character. After block 710, the method of FIG. 7 terminates.

Figure 8:
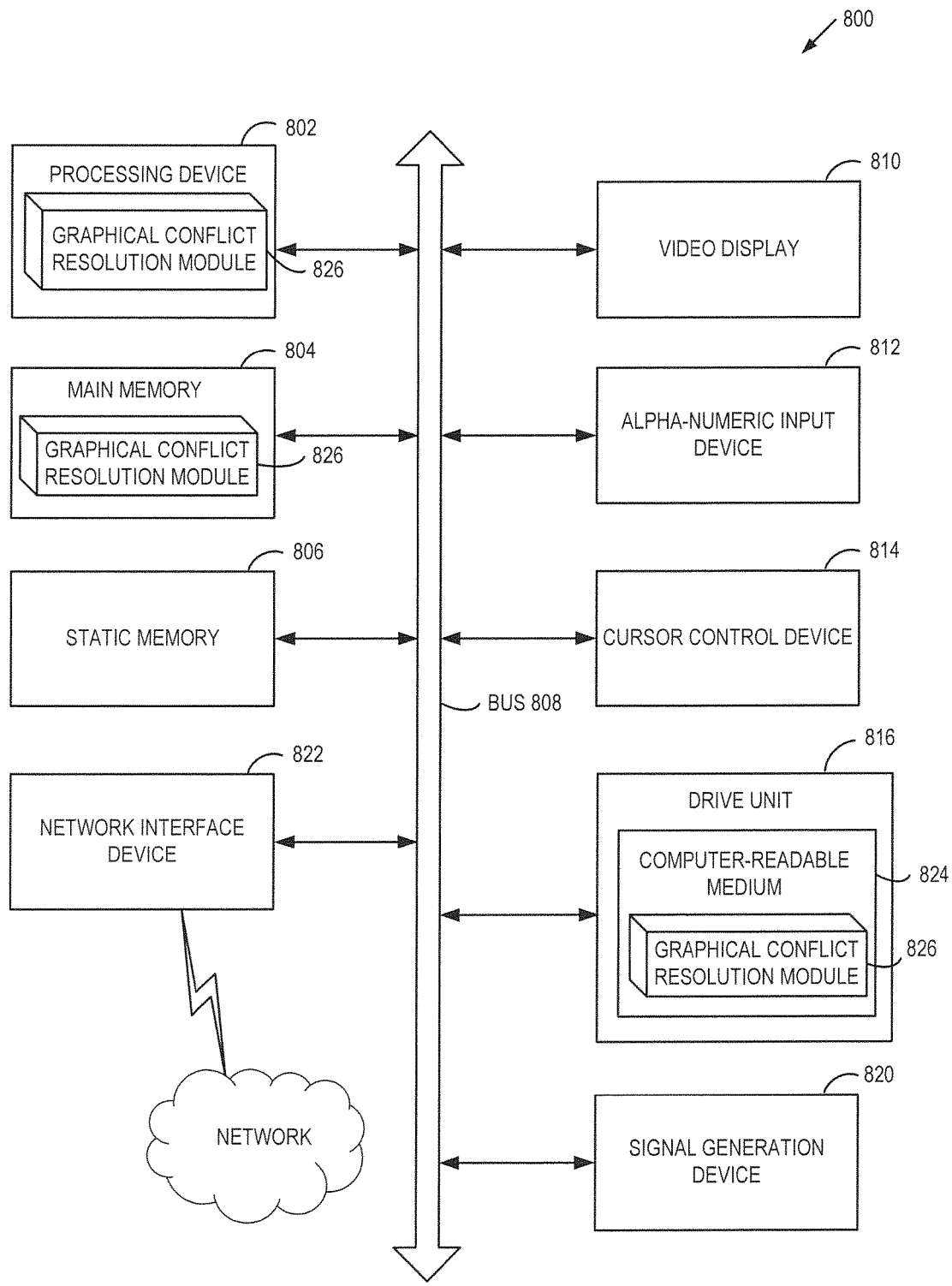
FIG. 8 depicts a block diagram of an illustrative computer system operating in accordance with examples of the invention.

FIG. 8 depicts an example computer system 800 which can perform any one or more of the methods described herein. In one example, computer system 800 may correspond to graphical simulation system 400 of FIG. 4. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute graphical conflict resolution module 826 for performing the operations and steps discussed herein (e.g., corresponding to the methods of FIGS. 5-7, etc.).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored graphical conflict resolution module 826 (e.g., corresponding to the methods of FIGS. 5-7, etc.) embodying any one or more of the methodologies or functions described herein. Graphical conflict resolution module 826 may also reside, completely or at least partially, within the main memory 804 and/or within the processing device 802 during execution thereof by the computer system 800, the main memory 804 and the processing device 802 also constituting computer-readable media. Graphical conflict resolution module 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "paring," "comparing," "identifying," "resolving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
receiving, by a processing device, a request to assign a first graphical asset and a second graphical asset associated with a first three-dimensional (3D) geometry of a simulated character of a video game to a same physical location on the first 3D geometry, wherein the first graphical asset comprises a second 3D geometry associated with a graphic rendering of a first object and the second graphical asset comprises a third 3D geometry associated with a graphic rendering of second object;
detecting, by the processing device, a graphical conflict between the first graphical asset and the second graphical asset, wherein the graphical conflict indicates that at least a portion of the first graphical asset and at least a portion of the second graphical asset graphically overlap at the same physical location on the first 3D geometry of the simulated character;
comparing attributes of the first graphical asset with attributes of the second graphical asset at the same physical location on the first 3D geometry of the simulated character; and providing, by the processing device, one of the first graphical asset or the second graphical asset for display at the physical location on the first 3D geometry of the simulated character in view of the comparing.

2. The method of claim 1 wherein detecting the graphical conflict comprises:
pairing the first graphical asset with the second graphical asset at the same physical location on the first 3D geometry of the simulated character.

3. The method of claim 1 wherein comparing the attributes of the first graphical asset with the attributes of the second graphical asset comprises:
identifying a first region of the physical location of the simulated character, wherein the at least a portion of the first graphical asset and the at least a portion of the second graphical asset graphically overlap;
determining a first layer value of the first graphical asset at the first region and a second layer value of the second graphical asset at the first region;
comparing the first layer value with the second layer value;
upon determining that the first layer value is greater than the second layer value, selecting the portion of the first graphical asset to display at the first region; and
upon determining that the first layer value is less than the second layer value, selecting the portion of the second graphical asset to display at the first region.

4. The method of claim 3 wherein the first graphical asset occupies the first region and a second region of the physical location of the simulated character, the second region adjacent to the first region.

5. The method of claim 4 wherein comparing the first graphical asset with the second graphical asset comprises:
identifying the first region of the physical location of the simulated character, wherein the portion of the first graphical asset and the portion of the second graphical asset graphically overlap;
identifying the second region of the physical location of the simulated character, wherein the first graphical asset and the second graphical asset do not graphically overlap;
determining the first layer value of the first graphical asset at the first region and the second layer value of the second graphical asset at the first region;
comparing the first layer value with the second layer value;
upon determining that the first layer value is greater than the second layer value, selecting the first graphical asset to display at the first region and the second region; and
upon determining that the first layer value is less than the second layer value, selecting the portion of the second graphical asset to display at the first region, and replacing the first graphical asset with a modified version of the first graphical asset at the second region.

6. The method of claim 1 wherein the first graphical asset graphically overlaps with the second graphical asset in a plurality of regions of the physical location on the simulated character, further comprising:
displaying the same one of the first graphical asset or the second graphical asset at each of the plurality of regions in view of the comparing.

7. The method of claim 6 wherein comparing the first graphical asset with the second graphical asset comprises:
identifying the first region of the physical location of the simulated character, wherein the portion of the first graphical asset and the portion of the second graphical asset graphically overlap and the first region is most remote in proximity from a root location of the simulated character;
identify the plurality of regions between the first region and the root location wherein the first graphical asset and the second graphical asset graphically overlap;
determining the first layer value of the first graphical asset at the first region and the second layer value of the second graphical asset at the first region;
comparing the first layer value with the second layer value;
upon determining that the first layer value is greater than the second layer value, selecting the first graphical asset to display at each of the identified regions; and
upon determining that the first layer value is less than the second layer value, selecting the second graphical asset to display at each of the identified regions.

8. The method of claim 1 wherein the first object comprises at least one of the 3D geometry of a shoe, a boot, a garment bottom, a garment top, a hat, or hair.

9. A computing apparatus comprising:
a memory to store instructions; and
a processing device, operatively coupled to the memory, to execute the instructions, wherein the processing device is to:
receive a request to assign a first graphical asset and a second graphical asset associated with a first three-dimensional (3D) geometry of a simulated character of a video game to a same physical location on the first 3D geometry, wherein the first graphical asset comprises a second 3D geometry associated with a graphic rendering of a first object and the second graphical asset comprises a third 3D geometry associated with a graphic rendering of second object;
detect a graphical conflict between the first graphical asset and the second graphical asset, wherein the graphical conflict indicates that at least a portion of the first graphical asset and at least a portion of the second graphical asset graphically overlap at the same physical location on the first 3D geometry of the simulated character;
compare attributes of the first graphical asset with attributes of the second graphical asset at the same physical location on the first 3D geometry of the simulated character; and
provide one of the first graphical asset or the second graphical asset for display at the physical location on the first 3D geometry of the simulated character in view of the comparing.

10. The apparatus of claim 9 wherein to detect the graphical conflict, the processing device is further to:
pair the first graphical asset with the second graphical asset at the same physical location on the first 3D geometry of the simulated character.

11. The apparatus of claim 9 wherein to compare the attributes of the first graphical asset with the attributes of the second graphical asset at the same physical location on the simulated character, the processing device is to:
identify a first region of the physical location of the simulated character, wherein the at least a portion of the first graphical asset and the at least a portion of the second graphical asset graphically overlap;
determine a first layer value of the first graphical asset at the first region and a second layer value of the second graphical asset at the first region;
compare the first layer value with the second layer value;

upon determining that the first layer value is greater than the second layer value, select the portion of the first graphical asset to display at the first region; and upon determining that the first layer value is less than the second layer value, select the portion of the second graphical asset to display at the first region.

12. The apparatus of claim 11 wherein the first graphical asset occupies the first region and a second region of the physical location of the simulated character, the second region adjacent to the first region.

13. The apparatus of claim 12 wherein to compare the first graphical asset with the second graphical asset, the processing device is to:

identify the first region of the physical location of the simulated character, wherein the portion of the first graphical asset and the portion of the second graphical asset graphically overlap;

identify the second region of the physical location of the simulated character, wherein the first graphical asset and the second graphical asset do not graphically overlap;

determine the first layer value of the first graphical asset at the first region and the second layer value of the second graphical asset at the first region;

compare the first layer value with the second layer value;

upon determining that the first layer value is greater than the second layer value, select the first graphical asset to display at the first region and the second region; and upon determining that the first layer value is less than the second layer value, select the portion of the second graphical asset to display at the first region, and replacing the first graphical asset with a modified version of the first graphical asset at the second region.

14. The apparatus of claim 9 wherein the first graphical asset graphically overlaps with the second graphical asset in a plurality of regions of the physical location on the simulated character, the processing device further to:

display the same one of the first graphical asset or the second graphical asset at each of the plurality of regions in view of the comparing.

15. The apparatus of claim 14 wherein to compare the first graphical asset with the second graphical asset, the processing device is to:

identify the first region of the physical location of the simulated character, wherein the portion of the first graphical asset and the portion of the second graphical asset graphically overlap and the first region is most remote in proximity from a root location of the simulated character;

identify the plurality of regions between the first region and the root location wherein the first graphical asset and the second graphical asset graphically overlap;

determine the first layer value of the first graphical asset at the first region and the second layer value of the second graphical asset at the first region;

compare the first layer value with the second layer value;

upon determining that the first layer value is greater than the second layer value, select the first graphical asset to display at each of the identified regions; and upon determining that the first layer value is less than the second layer value, select the second graphical asset to display at each of the identified regions.

16. A non-transitory computer readable storage medium, having instructions stored therein, which when executed by a processing device, cause the processing device to:

receive, by the processing device, a request to assign a first graphical asset and a second graphical asset associated with a first three-dimensional (3D) geometry of a simulated character of a video game to a same physical location on the first 3D geometry, wherein the first graphical asset comprises a second 3D geometry associated with a graphic rendering of a first object and the second graphical asset comprises a third 3D geometry associated with a graphic rendering of second object;

detect, by the processing device, a graphical conflict between the first graphical asset and the second graphical asset, wherein the graphical conflict indicates that at least a portion of the first graphical asset and at least a portion of the second graphical asset graphically overlap at the same physical location on the first 3D geometry of the simulated character;

compare attributes of the first graphical asset with attributes of the second graphical asset at the same physical location on the first 3D geometry of the simulated character; and provide one of the first graphical asset or the second graphical asset for display at the physical location on the first 3D geometry of the simulated character in view of the comparing.

17. The non-transitory computer readable storage medium of claim 16, wherein to detect the graphical conflict, the processing device is further to:

pair the first graphical asset with the second graphical asset at the same physical location on the first 3D geometry of the simulated character.

18. The non-transitory computer readable storage medium of claim 16, wherein the processing device is further to:

identify a first region of the physical location of the simulated character, wherein a portion of the first graphical asset and a portion of the second graphical asset graphically overlap;

determine a first layer value of the first graphical asset at the first region and a second layer value of the second graphical asset at the first region;

compare the first layer value with the second layer value;

upon determining that the first layer value is greater than the second layer value, select the portion of the first graphical asset to display at the first region; and upon determining that the first layer value is less than the second layer value, select the portion of the second graphical asset to display at the first region.

19. The non-transitory computer readable storage medium of claim 18, wherein the first graphical asset occupies the first region and a second region of the physical location of the simulated character, the second region adjacent to the first region, and wherein the processing device is further to:

identify the first region of the physical location of the simulated character, wherein the portion of the first graphical asset and the portion of the second graphical asset graphically overlap;

identify the second region of the physical location of the simulated character, wherein the first graphical asset and the second graphical asset do not graphically overlap;

determine the first layer value of the first graphical asset at the first region and the second layer value of the second graphical asset at the first region;

compare the first layer value with the second layer value;

upon determining that the first layer value is greater than the second layer value, select the first graphical asset to display at the first region and the second region; and upon determining that the first layer value is less than the second layer value, select the portion of the second graphical asset to display at the first region, and replace the first graphical asset with a modified version of the first graphical asset at the second region.

20. The non-transitory computer readable storage medium of claim 18, wherein the first graphical asset graphically overlaps with the second graphical asset in a plurality of regions of the physical location on the simulated character, and wherein the processing device is further to:
   identify the first region of the physical location of the simulated character, wherein the portion of the first graphical asset and the portion of the second graphical asset graphically overlap and the first region is most remote in proximity from a root location of the simulated character;
   identify the plurality of regions between the first region and the root location wherein the first graphical asset and the second graphical asset graphically overlap;
   determine the first layer value of the first graphical asset at the first region and the second layer value of the second graphical asset at the first region;
   compare the first layer value with the second layer value;
   upon determining that the first layer value is greater than the second layer value, select the first graphical asset to display at each of the identified regions;
   upon determining that the first layer value is less than the second layer value, select the second graphical asset to display at each of the identified regions; and
   display the same one of the first graphical asset or the second graphical asset at each of the plurality of regions in view of the comparing.

\* \* \* \* \*